US009823695B2

(12) United States Patent
Dam et al.

(10) Patent No.: US 9,823,695 B2
(45) Date of Patent: Nov. 21, 2017

(54) SCREEN-EDGE STYLUS RETAINER

(71) Applicants: Tuan Quoc Dam, Round Rock, TX (US); Timothy Uys, Leander, TX (US)

(72) Inventors: Tuan Quoc Dam, Round Rock, TX (US); Timothy Uys, Leander, TX (US)

( * ) Notice: Subject to any disclaimer, the term of this patent is extended or adjusted under 35 U.S.C. 154(b) by 0 days.

(21) Appl. No.: 14/963,066

(22) Filed: Dec. 8, 2015

(65) Prior Publication Data
US 2016/0161986 A1    Jun. 9, 2016

Related U.S. Application Data

(60) Provisional application No. 62/088,995, filed on Dec. 8, 2014.

(51) Int. Cl.
*A47F 5/00*     (2006.01)
*G06F 1/16*     (2006.01)
*F16M 13/02*    (2006.01)

(52) U.S. Cl.
CPC ......... *G06F 1/1607* (2013.01); *F16M 13/025* (2013.01); *G06F 2200/1632* (2013.01)

(58) Field of Classification Search
CPC .............................. G06F 1/1607; B43K 23/00
See application file for complete search history.

(56) References Cited

U.S. PATENT DOCUMENTS

| 5,996,956 A * | 12/1999 | Shawver | G06F 1/1626 248/309.1 |
| 7,536,210 B1 * | 5/2009 | Morris | G06F 1/1626 455/575.1 |
| 2013/0292530 A1 * | 11/2013 | Dang | G06F 1/1656 248/229.2 |

* cited by examiner

*Primary Examiner* — Amy Sterling
(74) *Attorney, Agent, or Firm* — Kirk Dorius

(57) ABSTRACT

A stylus mount includes first and second orthogonal screen edge clips and a stylus retainer associated with at least one of the first and second clips. The screen edge clips are attachable to a screen edge via at least one of a snap-fit, interference fit, and friction fit. The stylus retainer comprises an elongated channel to accommodate insertion of a stylus therein via longitudinal insertion into the length of the channel and via lateral insertion into a depth of the channel. Openings in the screen edge clips provide access to controls along a screen edge. A web extends between the first and second orthogonal screen edge clips with an adhesive, a tackifier, or a high-friction pad disposed across at least a portion of the web.

11 Claims, 4 Drawing Sheets

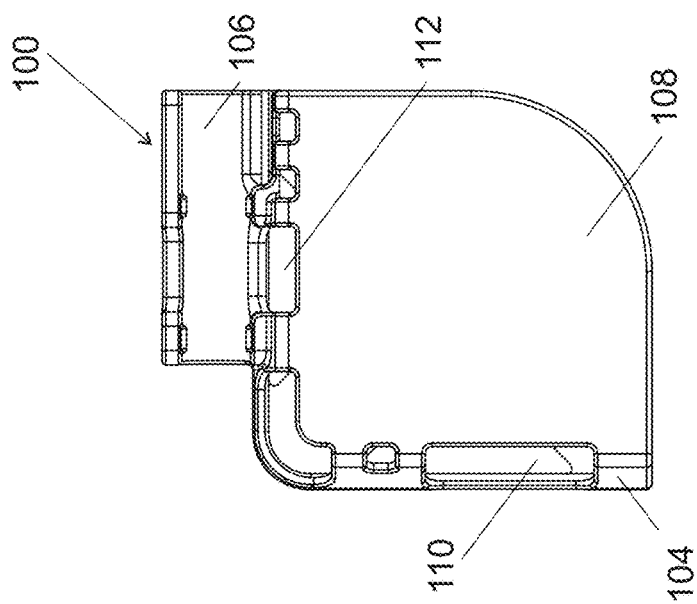
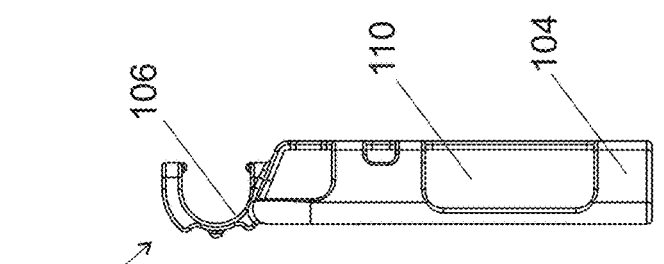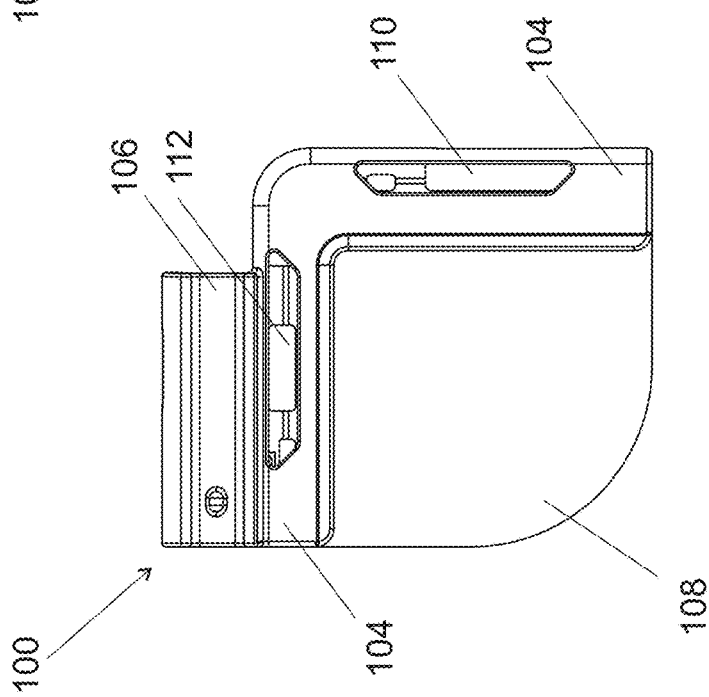

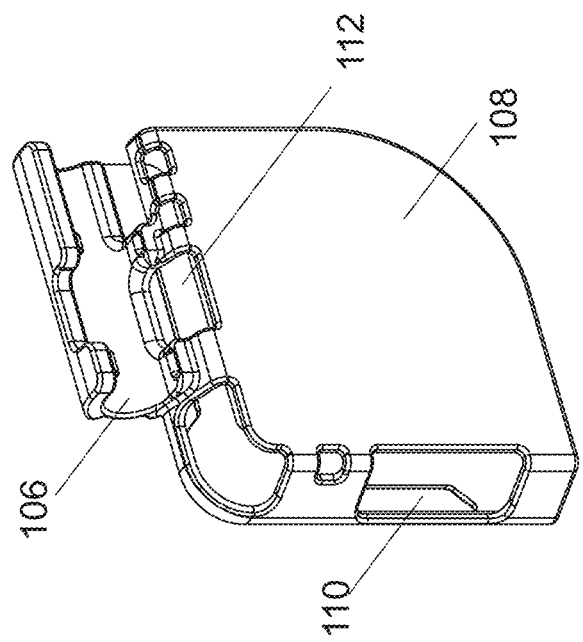
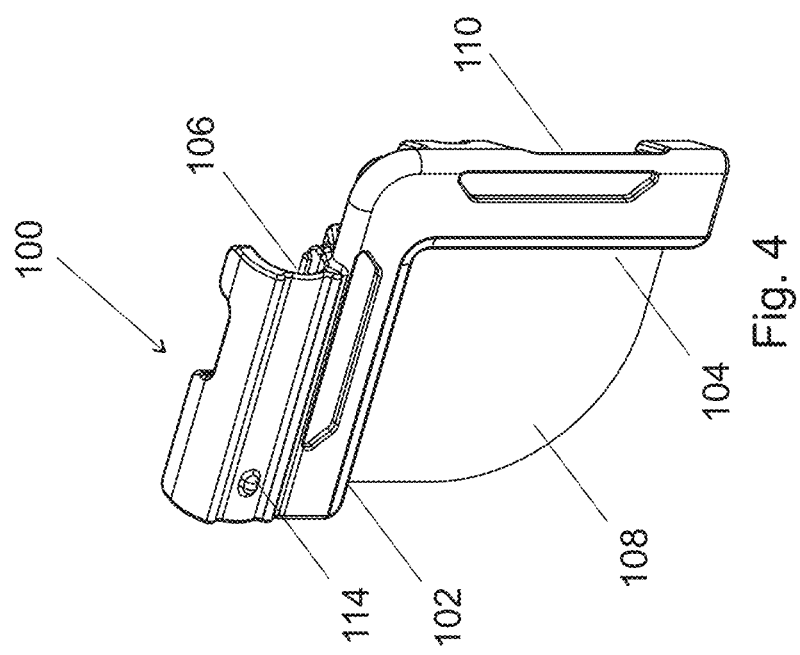

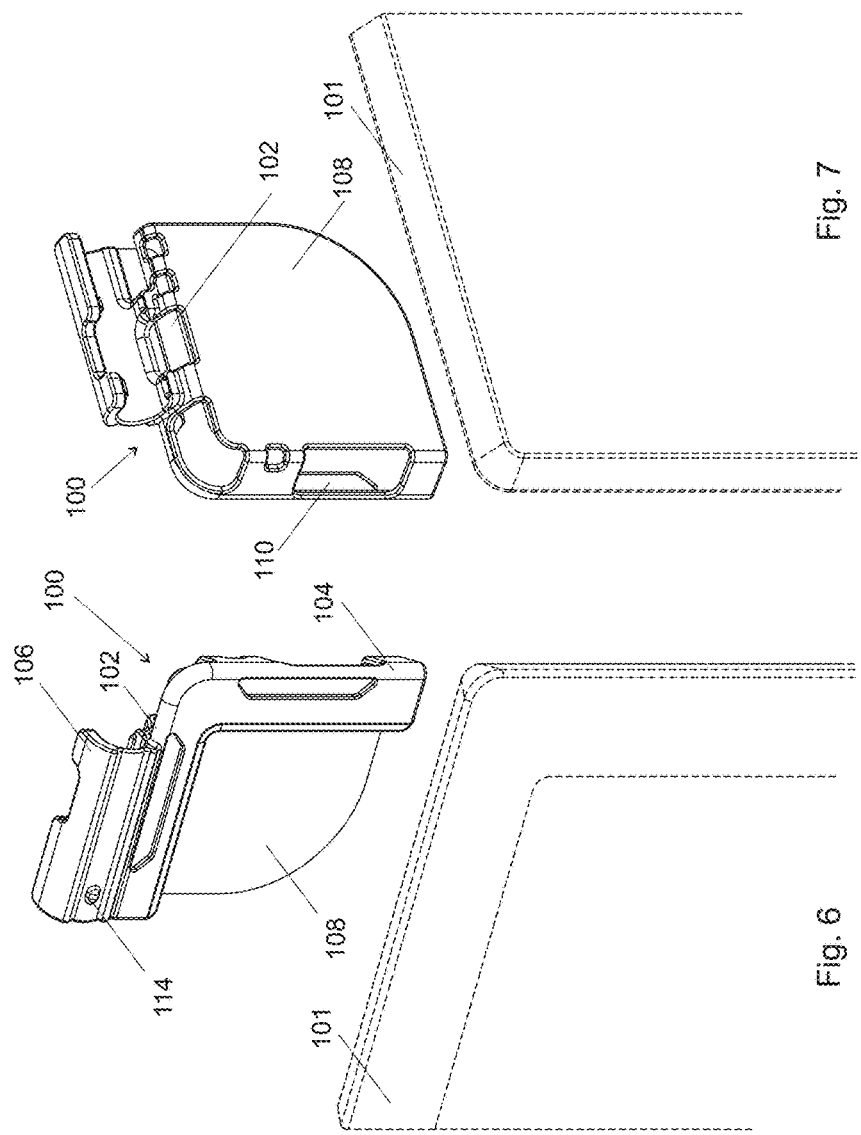

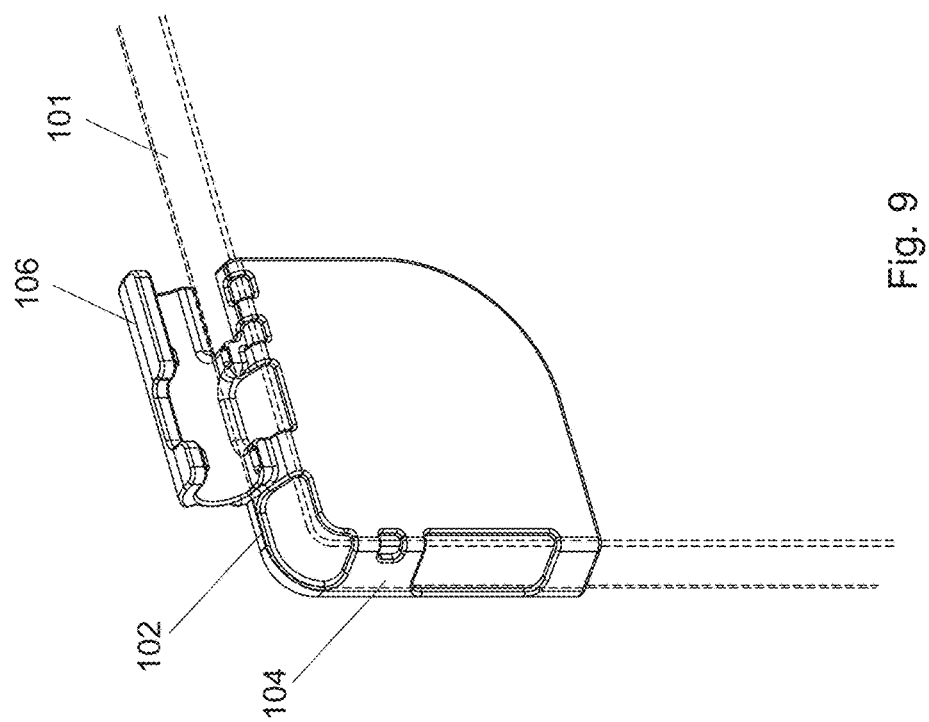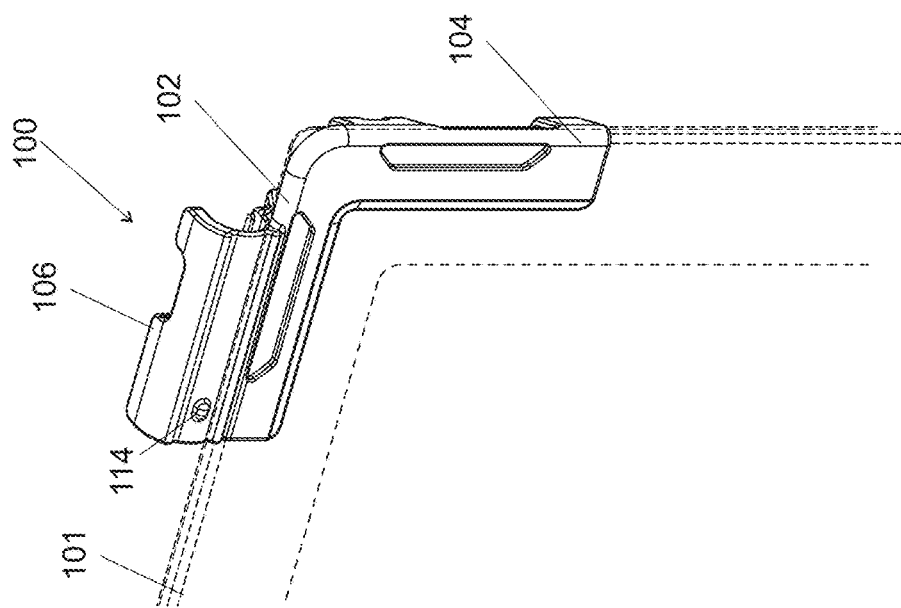

SCREEN-EDGE STYLUS RETAINER

CROSS-REFERENCE TO RELATED APPLICATION

This application claims priority to U.S. provisional application No. 62/088,995 filed Dec. 8, 2014 and titled "Screen-Edge Stylus Retainer" which is incorporated herein in its entirety by reference.

FIELD OF INVENTION

This invention generally relates to computer stylus retainers.

BACKGROUND OF THE INVENTION

Tablet computers and other touch screen computers can accept screen surface inputs, e.g., surface strokes or point contacts via finger or stylus movements.

Various mechanical means have been proposed to associate a stylus with a screen, e.g., tethers and stylus wells formed in the computer/screen body. As tablet manufacturers compete to produce thinner, smaller, and lighter tablets, prior stylus wells or other stylus retainers are increasingly being omitted from the tablet computer. Losing and replacing the stylus are common complaints of tablet consumers.

Accordingly, improvements are sought in associating a stylus with a tablet computer or other touch screen device.

SUMMARY OF THE INVENTION

While the way that the present invention addresses the disadvantages of the prior art will be discussed in greater detail below, in general, the present invention provides a stylus retainer attachable along two edges of a computer screen.

One aspect of the invention features, in some embodiments, first and second orthogonal screen edge clips or clasps and a stylus retainer associated with at least one of the first and second clips.

In some embodiments, one or more of the screen edge clips is configured to be attachable to a screen edge via at least one of a snap-fit, interference fit, friction fit, magnets, reusable contact adhesive and the like.

In some embodiments, the stylus retainer comprises an elongated channel to accommodate insertion of a stylus therein via at least one of longitudinal insertion into the length of the channel and lateral insertion into a depth of the channel. In some embodiments, the channel accommodates both longitudinal and lateral insertion of a stylus.

In some embodiments, the stylus retainer comprises a stylus clip engagement feature configured to positively engage a complimentary feature of a "pocket clip" associated with a stylus. In some embodiments, the stylus clip engagement feature is formed on an exterior wall of a channel of the stylus retainer.

In some embodiments, at least one of the edge clips defines one or more apertures therethrough to provide access to computer controls positioned along the edge of the screen over which the edge clip is positioned. In some embodiments, the one or more apertures formed in at least one of the edge clips helps to retain the edge clip to the screen via engagement with computer control features along the edge of the screen.

Another advantage of the present invention is the various possibilities for the placement of the stylus retainer relative to the screen. For example, in some embodiments, the edge clips are alternately repositionable at opposed corners of a screen to selectively position a stylus retainer along one of a top edge, bottom edge, and a side edge of a screen.

In some embodiments, a web or spanner extends between the first and second edge clips to engage a rear surface of a screen and prevent splaying of the edge clips.

In some embodiments, a tethering system includes a retractable tether that ensures the stylus remains associated with the screen.

In some embodiments, a tethering system includes a retractable tether that ensures the stylus remains associated with the screen.

In some embodiments, a reusable contact adhesive allows the tablet edge clips to be repeatedly removed and repositioned. In some cases, the contact adhesive can be refreshed, e.g., through rinsing with cold water.

External mounting of the stylus allows the tablet computer to make full use of the interior space for other components, such as CPU, heat sink, graphics processor and RAM storage. In areas where there is high heat, the embodiment protects the stylus and user from excessive heat. The embodiment also allows the user to safely store the stylus for transport, e.g., utilizing a pocket clip nib.

The embodiment also allows quick access to the stylus by the snap in/out feature of the channel as shown in FIG. 2, FIG. 8 and FIG. 9.

BRIEF DESCRIPTION OF THE DRAWINGS

A more complete understanding of the present invention may be derived by referring to the detailed description and claims when considered in connection with the Figures, wherein like reference numerals refer to similar elements throughout the Figures, and FIG. 1 illustrates a front view of a stylus retainer according to one embodiment;

FIG. 2 illustrates a side view of the stylus retainer of FIG. 1;

FIG. 3 illustrates a rear view of the stylus retainer of FIG. 1;

FIG. 4 illustrates a perspective front view of the stylus retainer of FIG. 1;

FIG. 5 illustrates a perspective rear view of the stylus retainer of FIG. 1;

FIG. 6 illustrates a perspective front view of the stylus of FIG. 1 positioned for attachment to a screen corner;

FIG. 7 illustrates a perspective rear view of the stylus of FIG. 1 positioned for attachment to a screen corner;

FIG. 8 illustrates a perspective front view of the stylus of FIG. 1 installed on a screen corner; and FIG. 9 illustrates a perspective rear view of the stylus of FIG. 1 installed on a screen corner.

DETAILED DESCRIPTION

The following description is of exemplary embodiments of the invention only, and is not intended to limit the scope, applicability or configuration of the invention. Rather, the following description is intended to provide a convenient illustration for implementing various embodiments of the invention. As will become apparent, various changes may be made in the function and arrangement of the elements described in these embodiments without departing from the scope of the invention as set forth herein. It should be appreciated that the description herein may be adapted to be employed with alternatively configured devices having different shapes, components, attachment mechanisms and the like and still fall within the scope of the present invention. Thus, the detailed description herein is presented for purposes of illustration only and not of limitation.

Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

In the following description, certain terminology is used to describe certain features of one or more embodiments of the invention. For example, the term "edge clip" as described herein may include, but is not necessarily limited to, a clip sized and configured for attachment to a respective screen edge. The edge clip and/or other stylus retainer components may be constructed from a wide variety of materials including, but not necessarily limited to, plastic, aluminum, composites, spring steel, and the like.

In accordance with various aspects of the present invention, a stylus retainer may be used to conveniently secure a stylus to a computer screen. That being said, the present invention is described herein in the exemplary context of a tablet computer. Similarly, "screen" as used herein, generally may be construed to mean any computer display device.

FIGS. 1-9 illustrate various views of a stylus retainer device for use with a tablet or computer screen. With reference to FIGS. 1-9, a stylus retainer 100 includes two orthogonal screen edge clips 102 and 104 configured to engage two screen edges forming a corner of a screen 101. A web 108 or other spanner extends between the two edge clips 102 and 104 to prevent splaying and separation of the edge clips from the screen 101. A stylus channel 106 extends from one of the edge clips 102 and 104 to receive a stylus (not shown). The stylus channel 106 is open at both ends to allow for longitudinal insertion of a stylus. The stylus channel 106 is also open along the length of the channel, e.g., with a C-shaped cross-section, to allow for lateral insertion of a stylus. Alternatively, a stylus with a pocket clip can be clipped to the channel side-walls at either end of the channel. In some embodiments, a pocket clip nib feature 114 extends from a back wall of the channel 106 positively engage a pocket clip, e.g., for more secure retention of the stylus during transport and computer use.

Any number of apertures (e.g., 110, 112), recesses, or other features may be defined on the edge clips to accommodate or positively engage any number of screen edge features, e.g., controls, buttons, switches, ports, and the like.

To install stylus retainer 100, edge clips 102 and 104 are aligned with respective screen edges at a corner of screen 101 and pressed into place. Edge clips 102 and 104 may engage the screen edges by at least one of snap-fit, interference fit, friction fit, magnets reusable contact adhesive, or other suitable surface contact means. Stylus retainer 100 may be installed to position a stylus along a top, bottom or side edge adjacent a selected corner. Stylus retainer 100 is removable and repositionable or may be more permanently fixed.

During use, the stylus may be retrieved from stylus retainer 106 and may be stowed in the retainer via insertion longitudinally or laterally into a channel of the stylus retainer. Alternatively, the stylus may be clipped to the retainer, e.g., via engagement of a pocket clip on the stylus with stylus retainer 106.

Accordingly, the present invention provides a simple, low-profile, repositionable stylus retainer for use with a wide-range of tablets and other touch screen devices. Similarly, while the present invention has been described herein as an apparatus and means for retaining a stylus, the present invention may be readily used with any number of writing instruments, computer peripherals, tools or other similar devices now known or hereafter developed.

Finally, while the present invention has been described above with reference to various exemplary embodiments, many changes, combinations and modifications may be made to the exemplary embodiments without departing from the scope of the present invention. For example, the various components may be implemented in alternative ways. These alternatives can be suitably selected depending upon the particular application or in consideration of any number of factors associated with the operation of the device. In addition, the techniques described herein may be extended or modified for use with other types of devices. These and other changes or modifications are intended to be included within the scope of the present invention.

The invention claimed is:

1. A stylus mount comprising:
first and second orthogonal screen edge clips configured to engage at least front surfaces of respective orthogonal first and second screen edges adjacent a corner of a screen;
a support extending between the first and second screen edge clips and configured to adhere to a back surface of the screen adjacent the corner of the screen to maintain the first and second screen edge clips securely engaged with the respective first and second screen edges; and
a stylus retainer associated with at least one of the first and second screen edge clips.

2. The stylus mount of claim 1 wherein one or more of the screen edge clips is further configured to be attachable to a screen edge via at least one of a snap-fit, interference fit, and friction fit.

3. The stylus mount of claim 1, wherein the stylus retainer comprises an elongated channel configured to accommodate insertion of a stylus therein via longitudinal insertion into the length of the channel.

4. The stylus mount of claim 3, wherein the elongated channel is further configured to accommodate insertion of a stylus therein via lateral insertion into a depth of the channel.

5. The stylus mount of claim 1, wherein the support is integrally formed with the first and second orthogonal screen edge clips.

6. The stylus mount of claim 1, further comprising a stylus clip engagement feature configured to positively engage a complimentary feature of a pocket clip associated with a stylus.

7. The stylus mount of claim 6, wherein the stylus clip engagement feature is formed on an exterior wall of a channel of the stylus retainer.

8. The stylus mount of claim 1, wherein at least one of the edge clips defines one or more apertures therethrough to provide access to computer controls positioned along an edge of a screen over which the edge clip is positioned.

9. The stylus mount of claim 8, wherein the one or more apertures formed in at least one of the edge clips serves to retain the edge clip to the screen via engagement with one or more computer control features along the edge of the screen.

10. The stylus mount of claim 1, wherein the edge clips are alternately repositionable at opposed corners of a screen to selectively position a stylus retainer along one of a top edge and a side edge of a screen.

11. A stylus mount comprising:
- first and second orthogonal screen edge clips configured to engage front surfaces of respective orthogonal first and second screen edges adjacent a corner of a screen and extending towards the rear of the screen;
- a planar support extending between the first and second orthogonal screen edge clips and presenting an adhesive to adhere the planar support to a back surface of the screen to maintain the first and second screen edge clips securely engaged with the respective first and second screen edges; and
- a stylus retainer associated with at least one of the first and second screen edge clips.

\* \* \* \* \*